(12) United States Patent
James (10) Patent No.: US 9,605,353 B2
(45) Date of Patent: Mar. 28, 2017

(54) APPARATUS AND METHOD FOR ADVANCED ELECTROCHEMICAL MODIFICATION OF LIQUIDS

(71) Applicant: Patrick I. James, Madison, WI (US)

(72) Inventor: Patrick I. James, Madison, WI (US)

(73) Assignee: Blue Planet Strategies, L.L.C., Madison, WI (US)

(*) Notice: Subject to any disclaimer, the term of this patent is extended or adjusted under 35 U.S.C. 154(b) by 78 days.

(21) Appl. No.: 13/926,291

(22) Filed: Jun. 25, 2013

(65) Prior Publication Data

US 2013/0277208 A1      Oct. 24, 2013

Related U.S. Application Data

(63) Continuation-in-part of application No. 13/117,769, filed on May 27, 2011, now Pat. No. 8,545,692, and a continuation-in-part of application No. 13/621,349, filed on Sep. 17, 2012.

(51) Int. Cl.

| | | |
|---|---|---|
| *C25B 15/00* | (2006.01) | |
| *C02F 1/46* | (2006.01) | |
| *C02F 1/461* | (2006.01) | |
| *C25B 9/16* | (2006.01) | |
| *C02F 101/20* | (2006.01) | |
| *C02F 103/10* | (2006.01) | |

(52) U.S. Cl.
CPC .......... *C25B 15/00* (2013.01); *C02F 1/46114* (2013.01); *C25B 9/16* (2013.01); *C02F 2101/20* (2013.01); *C02F 2101/203* (2013.01); *C02F 2103/10* (2013.01)

(58) Field of Classification Search
CPC ...................................................... C25C 7/002
USPC ................................................ 205/348, 754
See application file for complete search history.

(56) References Cited

U.S. PATENT DOCUMENTS

| | | | |
|---|---|---|---|
| 4,019,968 A * | 4/1977 | Spaziante et al. ............ 205/144 |
| 4,282,082 A | 8/1981 | Cook et al. | |
| 4,627,899 A | 12/1986 | Smith et al. | |
| 4,824,541 A * | 4/1989 | Malpas ................... C25C 7/002 204/222 |
| 6,176,997 B1 | 1/2001 | Shelp et al. | |
| 6,298,996 B1 * | 10/2001 | Spiegel et al. ................ 205/754 |
| 6,451,089 B1 | 9/2002 | Marsden et al. | |
| 6,663,689 B2 | 12/2003 | Marsden et al. | |
| 6,972,107 B2 | 12/2005 | Marsden et al. | |
| 7,041,152 B2 | 5/2006 | Marsden et al. | |
| 7,125,436 B2 | 10/2006 | Marsden et al. | |
| 7,341,700 B2 | 3/2008 | Marsden et al. | |

(Continued)

*Primary Examiner* — Keith Hendricks
*Assistant Examiner* — Salil Jain
(74) *Attorney, Agent, or Firm* — Miodrag Cekic; Intellectual Property Strategists, L.L.C.

(57) ABSTRACT

An apparatus including at least one electrolytic cell having at least one electrode compartment structured to contain a liquid electrolyte and a plurality of electrically conducting particulates forming a particulate bed, at least one reaction region structured to support electrochemical reactions, at least one collection region structured to facilitate collection of electrically conducting particulates, at least one feeding region structured to facilitate input of electrically conducting particulates, at least one actuation module arranged substantially outside of the at least one reaction region of relevance for the electrochemical modifications.

16 Claims, 6 Drawing Sheets

(56) References Cited

U.S. PATENT DOCUMENTS

| | | |
|---|---|---|
| 7,462,272 B2 | 12/2008 | Marsden et al. |
| 7,473,413 B2 | 1/2009 | Marsden et al. |
| 7,476,308 B2 | 1/2009 | Marsden et al. |
| 7,485,216 B2 | 2/2009 | Marsden et al. |
| 7,517,384 B2 | 4/2009 | Marsden et al. |
| 7,591,934 B2 | 9/2009 | Marsden et al. |
| 7,666,371 B2 | 2/2010 | Marsden et al. |
| 7,736,475 B2 | 6/2010 | Sandoval et al. |
| 8,012,318 B2 | 9/2011 | Marsden et al. |
| 8,016,983 B2 | 9/2011 | Stevens et al. |
| 2002/0074232 A1* | 6/2002 | Pinto et al. ............... 205/144 |
| 2004/0025638 A1* | 2/2004 | Slutskiy ...................... 75/714 |
| 2008/0169196 A1* | 7/2008 | James et al. ............... 204/554 |
| 2009/0065448 A1* | 3/2009 | Schedler ................... 210/770 |

* cited by examiner

APPARATUS AND METHOD FOR ADVANCED ELECTROCHEMICAL MODIFICATION OF LIQUIDS

CROSS REFERENCE TO RELATED APPLICATIONS

This application is based upon and claims benefits of copending and co-owned U.S. patent application Ser. No. 13/621,349, entitled "APPARATUS AND METHOD FOR ELECTROCHEMICAL MODIFICATION OF LIQUIDS" and Ser. No. 13/117,769, entitled "APPARATUS AND METHOD FOR ELECTROCHEMICAL MODIFICATION OF CONCENTRATIONS OF LIQUID STREAMS"; and co-owned U.S. patent application Ser. No. 13/251,646, entitled "APPARATUS FOR ELECTROCHEMICAL MODIFICATION OF LIQUID STREAMS" (resulting in the U.S. Pat. No. 8,409,408); Ser. No. 13/020,447 entitled "A METHOD FOR ELECTROCHEMICAL MODIFICATION OF LIQUID STREAMS" (resulting in the U.S. Pat. No. 8,262,892); and Ser. No. 11/623,658 entitled "APPARATUS AND METHOD FOR ELECTROCHEMICAL MODIFICATION OF LIQUID STREAMS" (resulting in the U.S. Pat. No. 7,967,967) all of which (the applications and the resulting patents) are incorporated herein by reference in its entirety.

FIELD OF THE INVENTION

The invention relates to an apparatus and a method for improved electrochemical modification of concentrations of constituents of liquid streams which contain organic and/or inorganic impurities. More precisely, the invention is concerned with an electrolytic cell technology with potentials to modification of concentrations of constituents found in liquid streams and more economically feasible extraction of selected dissolved constituents for commercial and environmental protection applications.

BACKGROUND OF THE INVENTION

Contamination of liquid streams with various organic and inorganic pollutants is a serious global environmental problem affecting environment quality and represents significant threat to human health and safety. Substantial heavy metal contamination of aquatic environments arises from commercial mining and metal extraction processes, surfaces modification and protection processes or communal and industrial waste sites resulting from a variety of active or defunct industrial fabrication and manufacturing activities. Similarly, significant organic water pollutants, like aliphatic, aromatic, or halogenated hydrocarbons and phenols which may also occur in combination with inorganic and metal contaminants and are frequently associated with oil exploration, extraction and refining, chemicals production, or large-scale farming and food processing.

In addition to potential for significant environmental damage, polluted liquid streams represent dilute sources of desirable raw materials like heavy metals and metal oxides. For example, the Berkeley Mine Pit in Butte, Mont. alone represents an estimated 30 billion gallons of mining influenced drainage which contains ~180 ppm of copper along with other metals and thus could yield up to 22,000 tons of pure copper by use of a small treatment facility.

An economically relevant group of prior art methods of removal of heavy metal ions from liquid solutions is based on chemical precipitation. This process is generally burdened by complexity, high cost, clear preference for extremely large facilities and high-volume operations, and efficiency decrease with decrease in concentration of pollutants. One disadvantage concerns the resulting byproduct of precipitated sludge which becomes a concentrated yet mixed contaminant source of the toxins in the source material. The conventional process relies on the fortunate co-precipitation of a variety of metal contaminants upon the addition of precipitating agents and appropriate pH adjustment. This has traditionally been a strength of the approach but results in very limited control of the selectivity of contaminant removal. As a result, the sludge precipitated is a hazardous mixture of low-value and toxic materials which makes valuable component recovery difficult and costly. Consequently, the sludge mandates further processing and costly long term disposal as a highly toxic waste. Many similar disadvantages burden alternative heavy ion removal methods that may incorporate: filtration, ion exchange, foam generation and separation, reverse osmosis, or combinations of listed processes.

Considerable market research conducted by many strategic copper metal industry consultants indicates that high grade ore reserves are becoming exhausted. For example, practitioners may need a way to use their existing recovery equipment and processes to recover metals from their plentiful but presently economically unusable low-grade ore. Currently, they can't economically use the ore as resultant process streams containing the target metal extracted from the ore are too weak and need strengthening (concentrating) to allow practical conventional target metal extraction. Thus, the economic considerations may be closely coupled with technology limitations providing for continuous motivation to improve ail aspects of the extraction process as measured by cost (capital and operational) reduction metrics.

The extraction technologies enabled by several aspects of the current invention may be adapted to address at least some of the above considerations. Additional features of the current invention, for example, may contribute to the feasibility of modifying prior art electrowinning technology so that it can be used to economically concentrate copper generated in low-grade process streams instead of simply removing it. In general, the disclosed embodiments of the advanced electrochemical modifications technology may prepare a process stream so the customer can produce new copper from currently impractical sources with existing in-place processing infrastructure, equipment, and processes.

In particular, the present invention may provide some innovative features for unlocking this vast and vitally needed resource. Typical mines contain significant amounts of their copper in such unviable ores. This invention may allow the use of this "waste" ore and thereby increase average heap leach mine ore utilization and overall output by 25% and thus globally yield 3 Billion lbs/yr of newly recoverable copper.

Furthermore, additional features of embodiments of the current invention may allow for practical metal recovery from: Leach processing of other metals, Acid Rock Drainage (ARD), heavy metal and radionuclide contaminated sites, and metal contaminated industrial effluents such as electrowinning, plating plant, pickling operations, and circuit board manufacture (etching) discharges.

SUMMARY OF THE INVENTION

The present invention considers an apparatus for electrochemical modification of liquid streams including at least one electrolytic cell having at least one electrode compartment structured to contain a liquid electrolyte and a plurality of electrically conducting particulates forming an at least one particulate bed, at least one reaction region of structured to support electrochemical reactions, at least one collection region structured to facilitate collection of electrically conducting particulates, at least one feeding region structured to facilitate input of electrically conducting particulates, at least one actuation module arranged substantially outside of the at least one reaction region of relevance for the electrochemical reactions. The at least one electrolytic cell also includes at least one external conduit arranged to transport at least a portion of the electrically conducting particulates, at least one system for substantially independent circulations of the liquid electrolyte through the at least one electrolytic cell, at least one system, for substantially independent circulations of the at least one liquid stream through the at least one electrolytic cell, and at least one system for driving unidirectional electric current supported by the electrolyte and participating in the electrochemical reactions in the at least one reaction region of relevance for the electrochemical reactions.

The plurality of conducting particulates have been arranged in progressive motion and said particulates motion is substantially independent of bulk electrolyte flow, and the at least one actuating module has been arranged to transfer momentum to at least a portion of the plurality of electrically conducting particulates and at least a portion of the liquid electrolyte sufficient for transport of the at least a portion of the plurality of electrically conducting particulates and the at least a portion of the liquid electrolyte from the at least one collection region to the at least one feeding region.

BRIEF DESCRIPTION OF THE DRAWINGS

The above and other embodiments, features, and aspects of the present invention are considered in more detail in relation to the following description of embodiments shown in the accompanying drawings, in which.

DETAILED DESCRIPTION OF THE INVENTION

The invention summarized above may be better understood by referring to the following description, which should be read in conjunction with the accompanying drawings. This description of an embodiment, set out below to enable one to build and use an implementation of the invention, is not intended to limit the invention, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form. Similar to the inventions in the applications incorporated by reference above (first paragraph), embodiments of this instant invention can be of planar, circular, and concentric tubular or other configurations containing two or more separate electrolyte chambers as required to address different application needs.

One class of embodiments of the instant invention, illustrated schematically in FIG. 1(b) (in comparison with schematics in FIG. 1(a) as disclosed for example in the aforementioned U.S. patent application Ser. No. 13/117,769), may be based on a two chamber electrolytic cell including at least one anode assembly 10 and at least one cathode assembly 20 separated by at least one separator 30. In this instant embodiment, one of the electrodes of the pair may be a non-particulate bed electrode while the other is a dynamic particulate bed where the bed of particulates is returned directly back onto itself. Either combination: Cathode: non-particulate/Anode: particles bed or the reverse may be employed in different embodiments.

The at least one anode assembly 10 of the illustrated embodiment includes at least one anode compartment 12 arranged to contain and define flow boundaries of the at least one liquid electrolyte anolyte and the at least one current anodic half-reaction distribution contactor device 17.

The at least one cathode assembly 20 of the illustrated embodiment may include at least one cathode compartment 22 arranged to contain and define flow boundaries of the at least one liquid electrolyte catholyte 24 (having the direction and intensity of the flow indicated by arrows), a plurality of particulates 25b of which at least a portion of are electrically conducting and forming the cathode particulates electrode bed 26 for effecting the at least one cathodic half-reaction, and a cathodic half-reaction current distribution contactor device 27 in at least intermittent contact with the cathode particulates electrode bed 26. The cathode particulates 25b are actuated to move in a substantially random fashion, relative to each other, but having an average velocity component as represented by arrows (i.e. progressive motion). The cathode compartment designed and structured in accordance to the instant embodiment, may enable liquid inflow 14 processing, either in a "flow-through" fashion, in a batch-by-batch fashion, or in some combination of the above, i.e. the processed liquid outflow 199 may be controllably released to allow for desired processing times.

Figure 1:
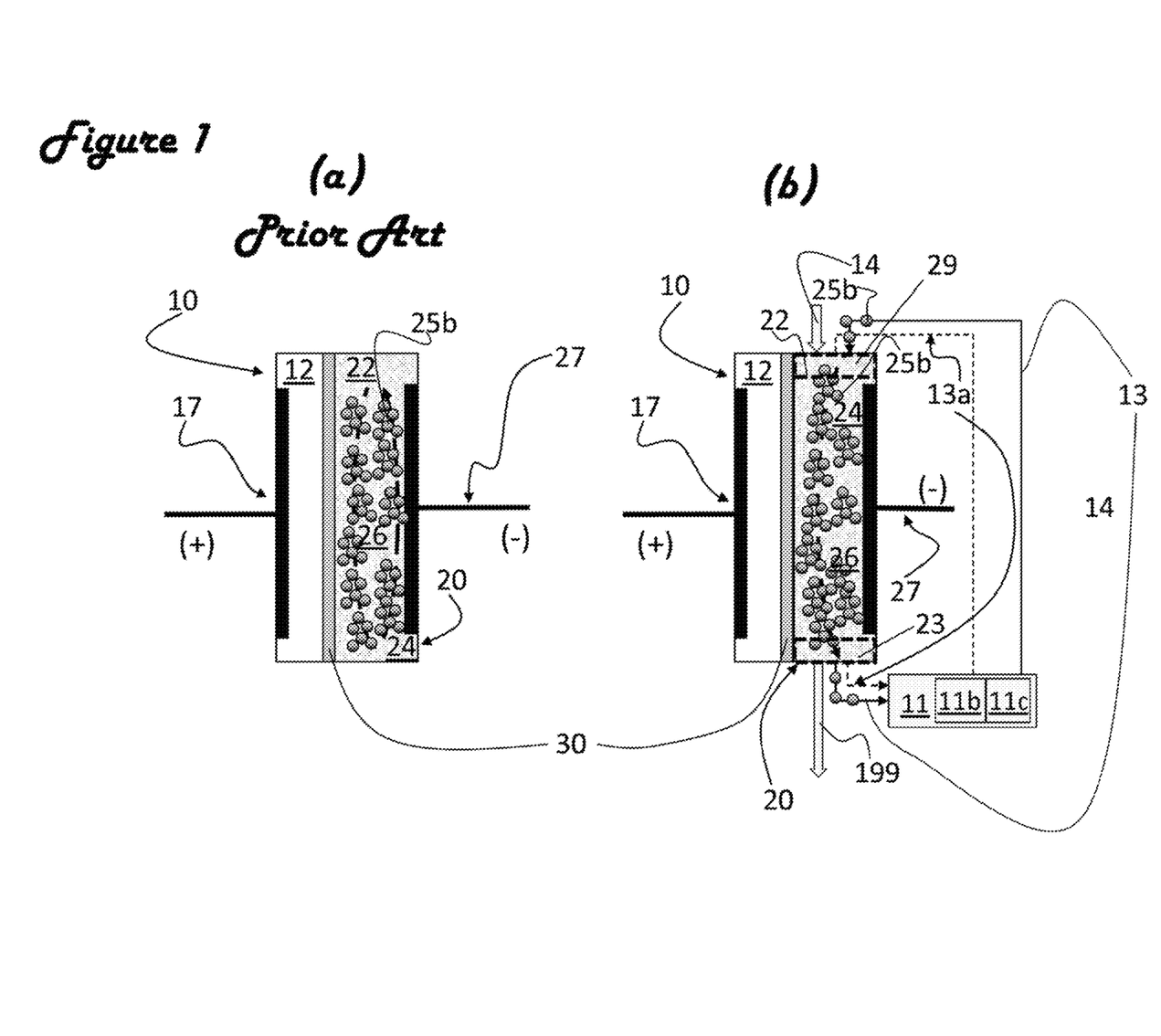
FIG. 1. is a schematic cross-sectional side view of devices in accordance with prior art (a) and current invention (b).

In the embodiment illustrated in FIG. 1, motion in the active (bed) portion of the at least one electrolytic cell remains substantially decoupled from the pertinent electrolyte flow. In particular, at least a portion of the liquid electrolyte catholyte 24 moves through the cathode compartment 22 substantially decoupled from the cathode particulates electrode bed 26 dynamics (i.e. having different velocities, mass flow rates, transit times through the cathode compartment 22, etc) such that the pertinent dynamics of the cathode particulates 25b and the liquid electrolyte catholyte 24 may be controlled essentially separately, it should be noted that it may be sufficient to decouple and control flows in the regions of relevance for the electrochemical reactions as driven by the cell current (substantial portions of volumes of the anode compartments 12 and cathode compartments 22), while the flows of the remaining portions of the devices may be arranged in accordance with the known technological principles and practice.

In the FIG. 1(b) illustrated embodiment, at least a portion of liquid electrolyte catholyte 24 and cathode particulates 25b may be actuated by at least one actuation module 11 arranged substantially outside of the regions of relevance for the electrochemical modifications activated by the current supported by the anodic half-reaction current distribution contactor devices 17 and the cathodic half-reaction current distribution contactor devices 27. At least a portion of the cathode particulates 25b may be collected in at least one cathodes particulates collection region 23 (typically bottom of an "upright" assembly) and circulated via at least one external (relative to the regions of relevance for the electrochemical reactions) conduit 13.

Depending upon particular embodiments, the cathode particulates 25b may be transported via the at least one external conduit 13 together with the electrolyte and other products of the electrochemical modifications in form of suspended or sedimented material (commonly referred to by practitioners as powders, precipitates, sludges, or slimes) or, at least partially separated (either in the collecting region or in the actuation module 11) from the associated liquids and suspensions and subjected to additional processing separately from the fluids flow. In turn, the associated liquids and/or suspensions (including powders, precipitates, sludges and slimes) may be transported separately e.g. via at least one additional external conduit 13a, separately processed, and reintroduced, if desirable, into the cell for example in the at least one introduction region 29 (typically top of the "upright" assembly).

The at least one actuation module 11 may include at least one actuation unit 11c employing an actuator such as, but not limited to, at least one pumping element consisting of at least one instance of devices front the conventional design classes chosen from a set of pumps consisting of diaphragm, peristaltic, screw, siphon, gear, progressive cavity, piston (rotary and reciprocating), rotodynamic, hydraulic ram, educator-jet, centrifugal (axial and radial), and combinations of the listed pump classes to mobilize the at least one particulates electrodes/electrolytes mixture.

One particular pilot embodiment may utilize peristaltic pump example capable of actuating electrolyte/particulate suspensions. Such pumps are represented by Weir Peristaltic Pump Model EP2-50H (5-25 GPM at 50 C OR 5-13 GPM at 80 C; commercially available from Weir Minerals, 2360 Millrace Court, Mississauga, Ontario, Canada; May 10, 2013), which is arranged for reliable actuating of a variety of processed or untreated liquids and suspensions in a controllable fashion.

One may note that, depending upon particular embodiments, the cathode particulates 25b may either go directly through the pump of the at least one actuation module 11, or one may separate the cathode particulates 25b by at least one separation unit 11b for separating the constituent components of the at least one particulates electrodes/electrolyte mixture, process it in an at least one integrated or separate processing unit, including controlling mobility of the cathode particulates 25b (e.g. fluidizing), transport them by pumping the fluids separately, and injecting the cathode particulates 25b into the fluids downstream of the pump feeding the at least one external conduit 13. In the former embodiments, the pump may directly impart some motion to the cathode particulates 25b and the moving fluid may sustains/extends the particulates motion. In the latter, the cathode particulates 25b may be at least in part externally coupled to the fluid motion by exchanging momentum and energy by the elements of the supporting fluids.

Again, a variety of materials can be used for structuring of the cathode particulates 25b, either having substantially common structure, or being constituted as mixtures of particulates having one or more distinct characteristics. One relevant physical characteristic may be sufficient conductivity of cathodes particulates 25b to effectively achieve electroplating of at least one target material. Additional features impacting practical utility may be the particle density and size. Less dense or smaller cathode particulates 25b may fluidize more easily and require less energy per particle to retain mobility of the cathode particulates electrode bed 26. Cathode particulates 25b incorporating solid copper at least in part, may be utilized in some embodiments but may be suboptimal at least regarding efficient pump/transport at desirable fluid rates and slurry loadings. Titanium particulates may be more beneficial and aluminum even more so. Forms of carbon, coal, and graphite can be conductive and low density and may be desirable considering that the industry has developed a range of pumps for transporting carbon/graphite slurries around power plants etc. Carbobeads of particular size, a particular form of carbon which has recently become available in large quantities (e.g. from ASBURY CARBONS, Ward Seals Headquarters at 405 Old Main Street; P.O. Box 1144, Asbury N.J.) due to its use in the oil industry for drilling and/or fracting, may be utilized in some embodiments. Carbobeads are low density, roundish, physically robust, affordable, and can be very uniform in size. More exotic pellet/bead forms (such as metallized plastic, metallized ceramic, metal-plastic and metal-ceramic composites or mixtures utilizing one or more of these) could also be used in different embodiments.

As indicated above, the at least one actuation module 11 of different embodiments may incorporate separation unit 11b devices structured for effecting at least partial separations of cathode particulates 25b and additional processing of separated cathode particulates 25b. In particular embodiments, separation of cathode particulates 25b may be facilitated by usage of various separation mechanisms including but not limited to gravity, magnetic properties, characteristic dimensions, electrostatic properties, electrodynamic properties, momentum transfer, tribiological properties, solubility properties, chemical properties, thermal properties, absorption properties, etc. employed in units like but not limited to stationary (gravity assisted) or motion assisted screens, separators, and or classifiers. Various separation and classification equipment is commercially available, for example, from aforementioned Weir Minerals. In addition, magnetic particulates may be processed using various magnetic and/or cross-flow separators, represented by those available from Eriez Manufacturing Co. of 2200 Asbury Road, Erie, Pa. 16506-0440 U.S.A.

As mentioned above, in the embodiments represented by the schematics in FIG. 1(b), the cathode particulates 25b may be at least partially re-circulated via the at least one external conduit 13 in association with appropriate fluids including the liquid electrolyte catholyte 24, products of the liquid electrolyte catholyte 24 processing, and/or additional fluids introduced into the at least one actuation module 11 to facilitate processing and/or transport in the at least one external conduit 13. In some embodiments the at least one additional external conduits 13a, having generally different sizes and transporting capacities, may be arranged for transport of fluids and suspensions separated from the aforementioned transport of cathode particulates 25b.

Figure 2:
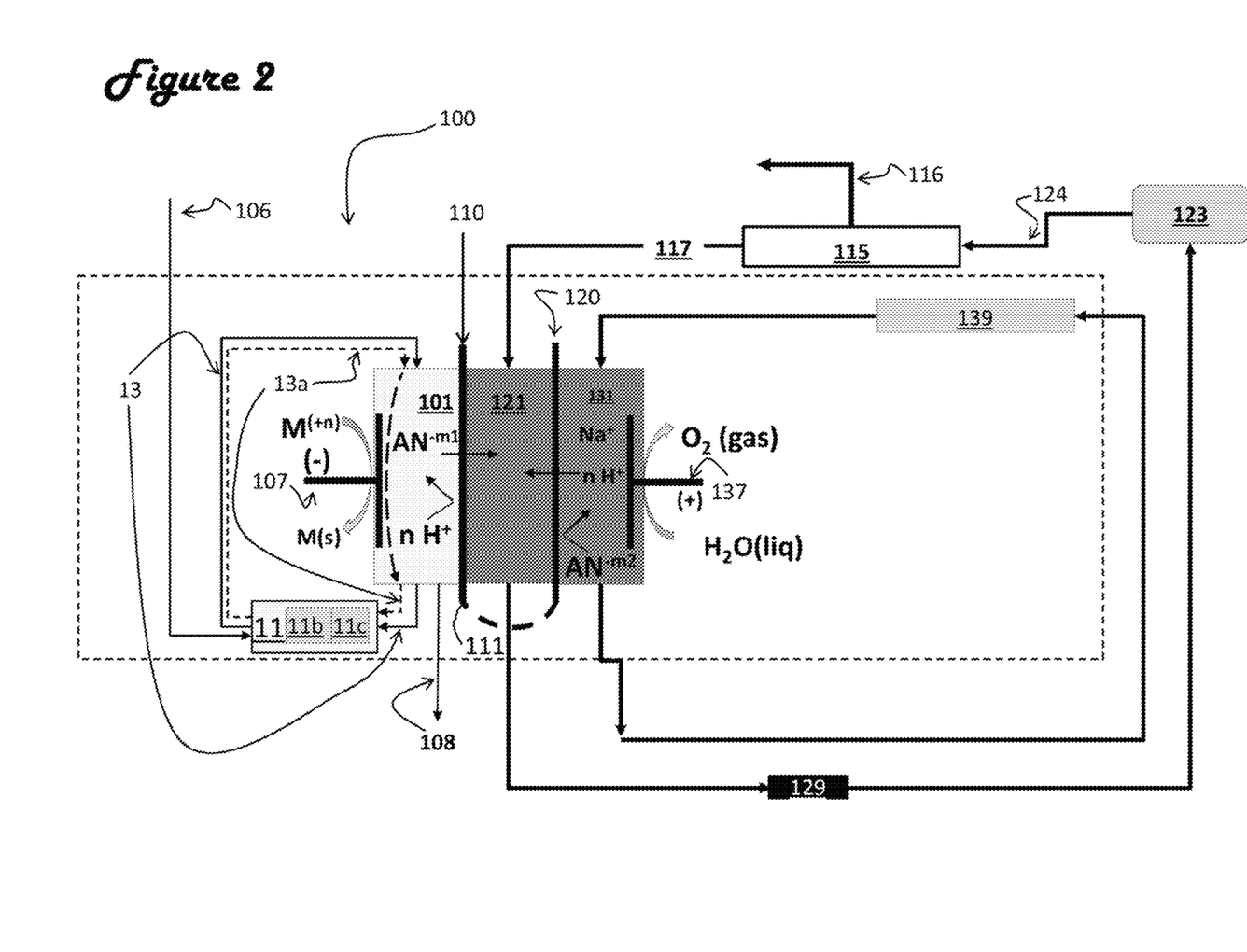
FIG. 2. is a schematic cross-sectional view of one embodiment of a device in accordance with the current invention.

Regarding an additional family of embodiments represented by the schematic in FIG. 2, (based upon above-incorporated application Ser. No. 13/621,349) at least one electrolytic cell 100 having at least three compartments defined by the use of at least two not necessarily equivalent separation structures 110 and 120 constructed from, at least two ion conductive separators such as ion conductive membranes, as recited in above-incorporated patent application Ser. No. 13/621,349 and with at least two substantially distinct electrolyte flows circulated through the electrolytic cell 100. The at least three compartments electrolytic cell 100 of this patent application additionally incorporates the at least one actuation module 11 containing at least one actuation unit 11c and one or more separation units, the at least one external conduit 13, and/or at least one additional external conduit 13a, similar to these disclosed above regarding the FIG. 1.

It may be noted that the input 106, depending on circumstances of different embodiments, may be introduced directly into the at least one cathode compartment 101 (as illustrated, for example, in FIG. 1 of the patent application Ser. No. 13/621,349), or may be introduced into the external transport system, e.g. into the at least one actuation module 11. One may note that the embodiment of FIG. 2 of current application may offer additional degrees of freedom for controlling the liquid flows through the system and/or additional flexibility for optimization of the overall efficiencies.

Figure 3:
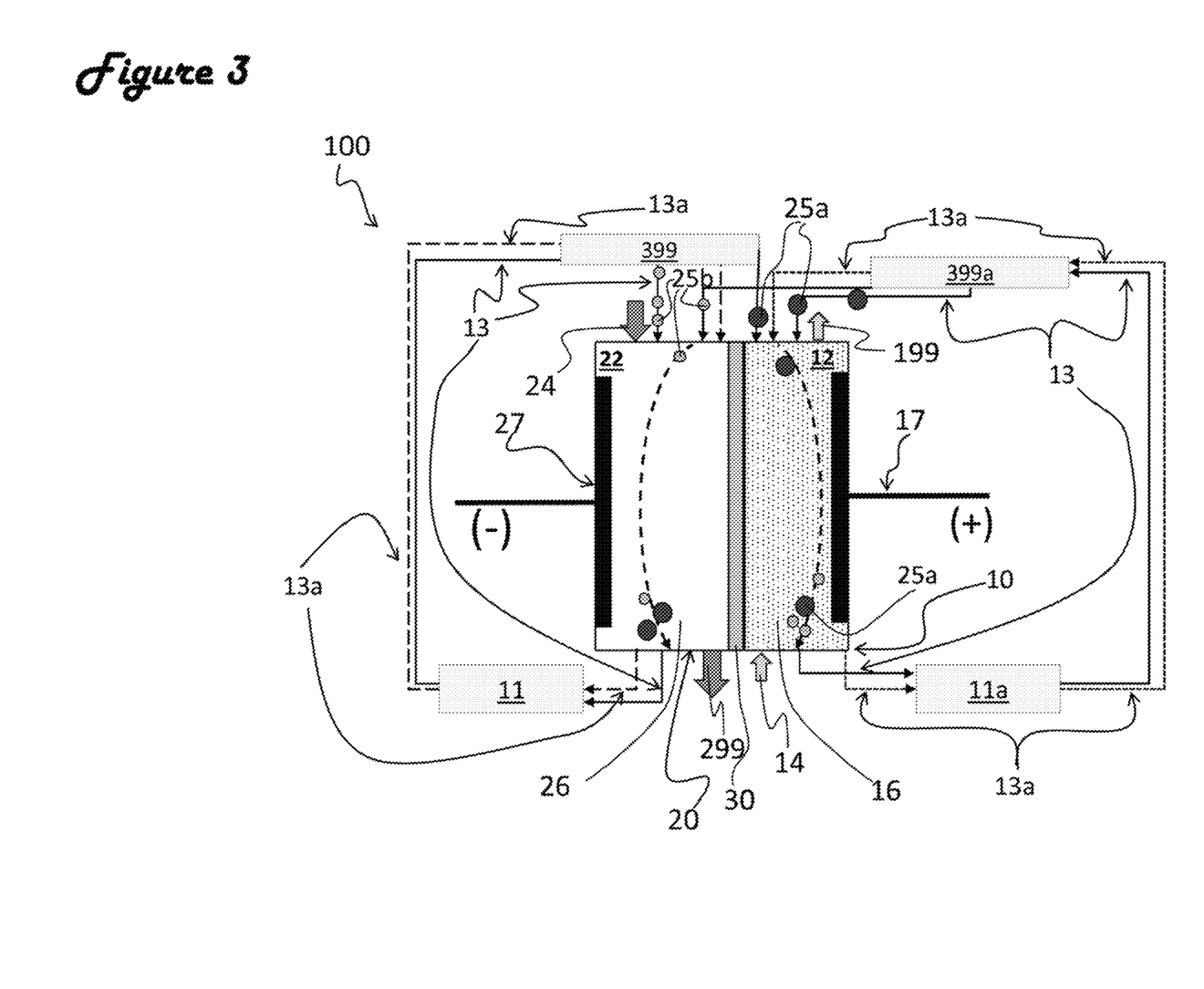
FIG. 3. is a schematic cross-sectional view of another embodiment a device in accordance with the current invention.

Regarding a different class of embodiments represented by the schematics in FIG. 3, at least two substantially distinct liquid streams (cathodic inflow 24 and anodic inflow 14) may be arranged for processing in the at least one electrolytic cell 100. In particular embodiments, modified (processed by the at least one electrolytic cell 100) outflow liquid streams, including an anodic outflow 199 and a cathodic outflow 299 may result as products of the liquid stream modification process.

The FIG. 3 illustrated cell incorporate at least two distinct external circulation systems consisting of, at least one catholyte circulation path (incorporating at least one actuation module 11, the at least one external conduit 13, and/or at least one additional external conduits 13a), and at least one anolyte circulation path (incorporating at least one additional actuation module 11a, the at least one external conduit 13, and/or at least one additional external conduits 13a). The illustrated embodiment may allow for additional degrees of freedom available for optimization of anodic and cathodic processes and/or more efficient operation of the electrolytic cell 100.

In addition, for the electrolyte/electrode mixture flows of both compartments (anode 12 and cathode 22), the conduits 13 and 13a may be arranged to recirculate the unripe electrode particulates 25b and ripe electrode particulates 25a through pertinent compartments, including at least one cathode compartment 22 and the at least one anode compartment 12. The determination of ripe vs. unripe particulates may be embodiment-dependant. For example, in embodiments directed toward concentration of selected targeted materials from liquid streams, amounts of targeted materials incorporated/bound to into/onto the respective particulates may indicate relative ripeness. In the FIG. 3 representative embodiments directed toward extraction of targeted metals via initial deposition (loading) of metal species to the particulates, transfer of desired metal-enriched particulates to the anode compartments, and subsequent stripping of targeted metal species in the anode compartment 12, the ripe particulates (with respect to the cathode compartment 22 processes) may represent sufficiently loaded particulates 25a selected for transfer to the anode compartment 12, while, the unripe particulates (with respect to the cathode compartment 22 processes) may represent sufficiently stripped particulates 25b selected for transfer to the cathode compartment 22.

In different embodiments, for example in a manner disclosed in patent application Ser. No. 13/117,769, the conduits 13 and 13a may be arranged to at least partially transport particulates 25a and/or 25b between compartments 22 and 12 and vice versa.

Furthermore, the illustrated embodiments may incorporate additional and separate processing units (at least one cathodic processing unit 399, and/or at least one anodic processing unit 399a) which may allow for separate processing of particulates received from the cathode compartment 22 and particulates received from the anode compartment 12.

In the illustrated embodiment structured, for example, for removal of targeted metals from the liquid electrolyte catholyte 24 stream while concentrating the targeted metals in the outflow 199 in a flow-through process that may be single pass or use a degree of recirculation, the separate cathodic and anodic processing units 399 and 399a may be arranged to separate particulates with respect to at least one extensive property indicative of a characteristic of interest such as the of amounts of targeted materials incorporated/bound to into/onto the respective particulates. In different embodiments the processing units may separate particulates by various separators/mechanisms on the basis of properties including but not limited to gravity, magnetic properties, characteristic dimensions, electrostatic properties, electrodynamic properties, momentum transfer properties, tribiological properties, solubility properties, chemical properties, thermal properties, absorption properties, etc. pertinent to, but not limited by, properties like particulate mass, characteristic dimensions, density, buoyancy, mobility or other physic-chemical features.

In one class of the FIG. 3 illustrated embodiments, the cathodic and anodic processing units 399 and 399a may separate particulates discriminating by particulates size. Thus, the cathodic processing unit 399 may separate and deliver relatively larger (ripe) particulates 25a to the anode compartment 12 for stripping (harvesting) while delivering the relatively smaller (unripe or not sufficiently ripe) particulates 25b back to the cathode compartment 22 for further loading ("ripening"). Similarly, the anodic processing unit 399a may separate and deliver relatively larger and not sufficiently stripped (not sufficiently unripe) particulates 25a back to the anode compartment 12 for additional stripping (harvesting) while transferring the relatively smaller and more fully stripped (harvested) particulates 25b to the cathode compartment 22 for subsequent loading (ripening).

One may note that, in spite of the apparent symmetry of the above recitation, the processing units 399 and 399a may be significantly different and use different processing mechanisms, circulation pathways, pass through rates, etc. as desired for a specific application being generally based on different particulates and processing properties, separation limits, capacities, and/or efficiencies for example.

Several experimental and pilot devices in accordance with various embodiments of the present invention have been developed, designed, and utilized for performance investigations. Significant parameters characterizing some of the experimental and pilot devices have been summarized in Table 1. below. The summarized performance characteristics have been tested and operated mostly for evaluation of functionalities using different particulates on Copper solutions, although many different materials may be used, as discussed above, even in the embodiments based on the Table 1. pertinent devices.

TABLE 1

| Parameter | Values | | | |
| --- | --- | --- | --- | --- |
| | Copper Particulates Electrode (FIG. 4) Target Chemistry | Carbon Particulates Electrode (FIG. 5) | Carbon Particulates Electrode (FIG. 6) Electrolytic System 1 | Carbon Particulates Electrode Electrolytic System 2 |
| Cell Power | 1 Amp 1.9-23 V | 1 Amp 2.4-2.8 V | 2 Amp 4.2-5.6 V | 600 Amps 0.2-6.5 V |
| Catholyte Electrolyte Circulation Pump | 1.5 Amps 24.1 V | 1.9 Amps 24 V | 1.9 Amps 24 V | 7.5 Hp 150 GPM |
| Catholyte Slurry Circulation Pump | N/a N/a | N/a N/a | 2 Amps 4.5 V | 7.5 Hp 25 GPM |
| Electrolyte Volume | 1.0 L | 0.275 L | 0.280 | 300 L |
| Initial Copper Concentration | 583 ppm | 941 ppm | 958 ppm | 1000 ppm |
| Final Copper Concentration | 53 ppm | 14 ppm | 4 ppm | 10-50 ppm |
| Treatment Time | 48 min | 15 min | 20 min | 35-45 min |
| Electrolyte pH | Initial: 2.0 Final: 2.0 | Initial: 1.9 Final: 1.8 | Initial: 1.9 Final: 2.3 | Initial: 2 Final: 2.2 |
| Electrolyte Temperature | 22° C. | 22° C. | 22° C. | <50° C. |

Figure 4:
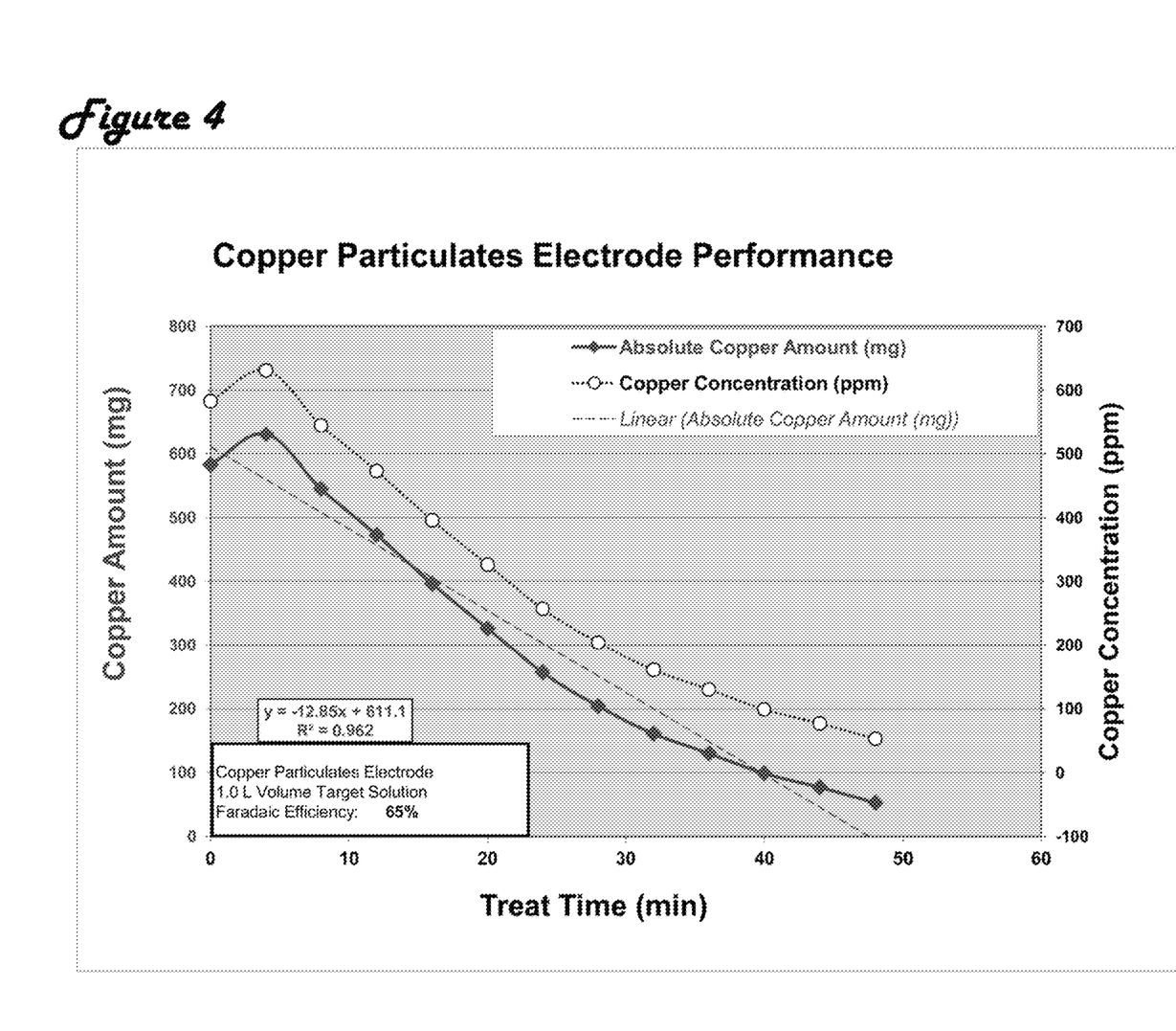
FIG. 4. is a graphic illustration of operational parameters achieved by one embodiment of a device in accordance with the current invention.
Figure 5:
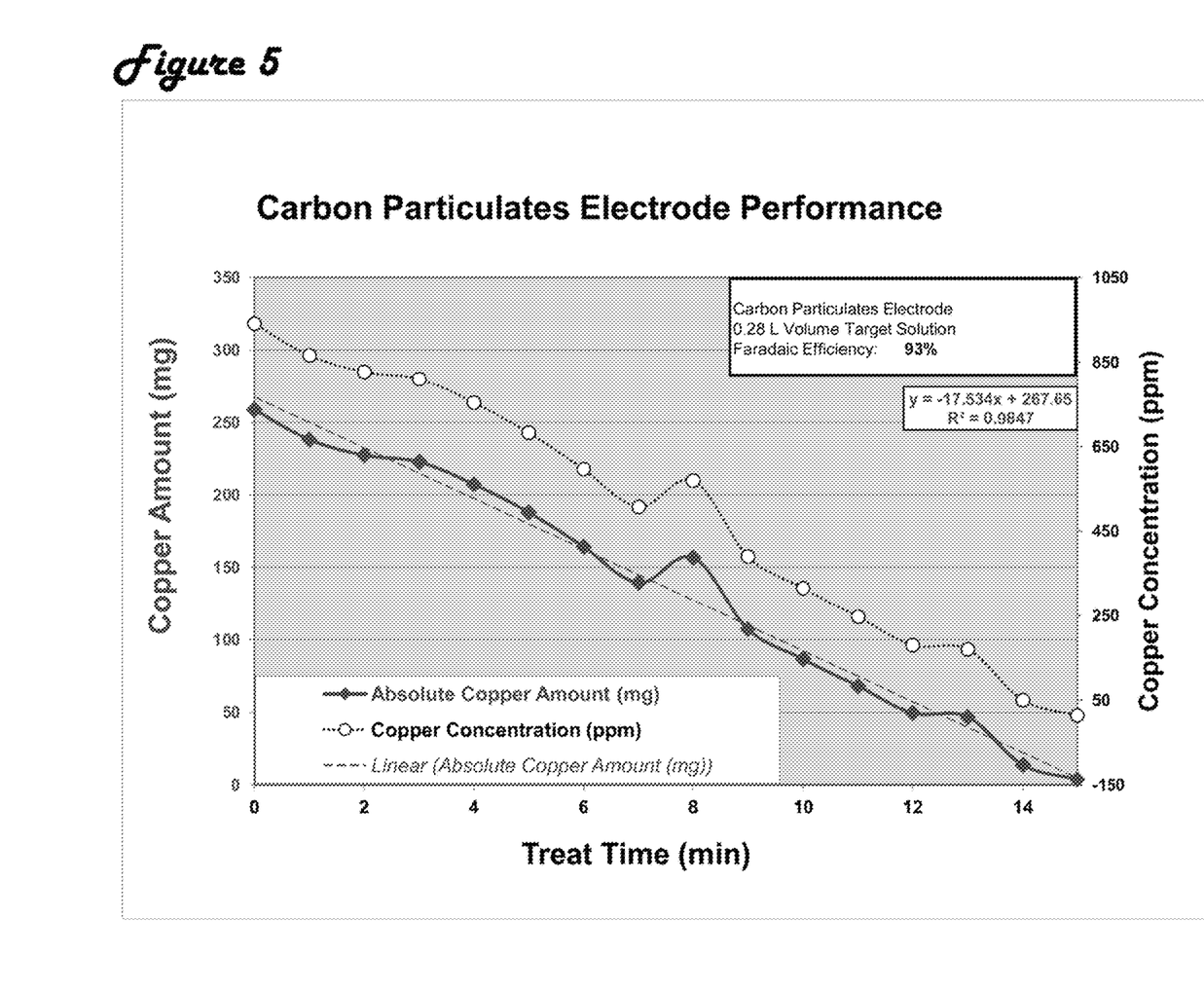
FIG. 5. is a graphic illustration of operational parameters achieved by another embodiment of a device in accordance with the current invention.
Figure 6:
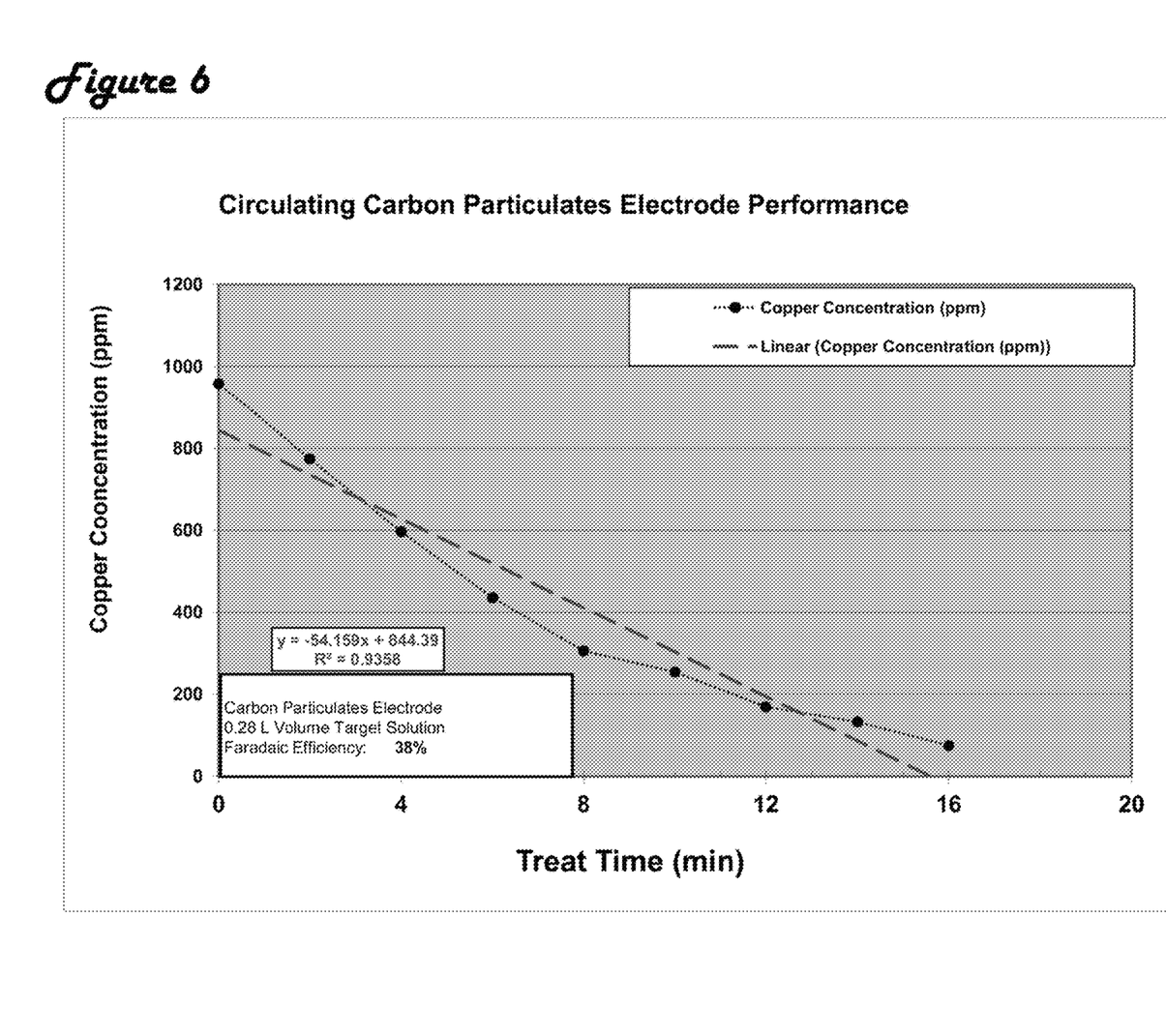
FIG. 6. is a graphic illustration of operational parameters achieved by yet another embodiment of a device in accordance with the current invention.

Some test results have been illustrated in FIGS. 4-6. The graph in FIG. 4 demonstrates capabilities of a copper particulates-based cell to efficiently operate at 1 Amp current level while extracting Copper from solutions at and below 50 ppm of Copper. It may be noted that the particular cell removed Copper at an average Faradic Efficiency of 65% from ~0.6 g/L to 0.05 g/L and did not exhibit significant saturation indicating capabilities of extended operation at concentrations of less than 10 ppm of metal Copper.

Similarly, regarding performance of the carbon-particle cell as illustrated in FIG. 5 results across a similar concentration regime are comparable or even superior to those seen in FIG. 4, one may note that 15 min. of cell operation at 1 A (substantially at 2-8V or less) Copper concentration in the resulting filtrate may be reduced to the approximate level of tens of ppm after only 15 min. of cell operation at an average Faradiac Efficiency of 93% from about 0.7 g/L to about 0.07 g/L (without indication of significant limitations to achieve even lower concentration by extended and/or optimized process in various embodiments).

Regarding results in FIG. 6, one may note successful application of a carbon-particulate based flow-through cell operation at 2 A at an average Faradic Efficiency of 38% also yields results consistent with the prior results shown in FIG. 4 and FIG. 5. It may be also noted that this cell managed to reduce the absolute Copper amount stored in the initial fill to less than 1% (corresponding to about 1 mg) of the initial value (approximately 250 mg) in less than 15 min. of operation.

Additionally, one may note that various pilot units scaled to the approximate scale of commercial pumps and particulates processing devices as indicated above, indicate no significant problems pertinent to industrial scale operations capable to extract 99% of targeted metals and significantly reducing pollution risks potentially associated with the feeding fluids and runoffs as found in particular localities.

The present invention has been described with references to the exemplary embodiments arranged for different applications. While specific values, relationships, materials and components have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

I claim:

1. An apparatus for electrochemical modification of liquid streams including at least one electrolytic cell which comprises:

at least one anode assembly including at least one anode compartment arranged to contain a liquid electrolyte anolyte and a plurality of electrically conducting particulates forming an anode particulate bed, at least one reaction region structured to support electrochemical reactions, at least one collection region structured to facilitate collection of said electrically conducting particulates, at least one introduction region structured to facilitate input of said electrically conducting particulates, and at least one current distribution contactor device in at least intermittent contact with the anode particulate bed;

at least one cathode assembly including at least one cathode compartment arranged to contain a liquid electrolyte catholyte and the plurality of electrically conducting particulates forming a cathode particulate bed, at least another reaction region structured to support electrochemical reactions, at least another collection region structured to facilitate collection of said electrically conducting particulates, at least another introduction region structured to facilitate input of said electrically conducting particulates, and at least another current distribution contactor device in at least intermittent contact with the cathode particulate bed;

at least one actuation module positioned substantially outside of the at least one and the at least another reaction regions and arranged to actuate the plurality of conducting particulates forming the anode particulate bed and the cathode particulate bed, at least two external conduits arranged to support transport of at least a portion of the plurality of electrically conducting particulates, a portion of the liquid electrolyte anolyte, and a portion of the liquid electrolyte catholyte;

and at least one system for driving at least one unidirectional electric current supported by the liquid electrolyte anolyte and the liquid electrolyte catholyte, such that the at least one unidirectional current participates in the electrochemical reactions in the at least one reaction region and in the at least another reaction region;

wherein, the plurality of conducting particulates have been arranged in motion and said particulate motion is substantially independent of bulk flow of the at least one of the liquid electrolyte anolyte and the liquid electrolyte catholyte;

wherein, the at least one actuating module has been arranged to transfer momentum to a mixture of at least a portion of the plurality of electrically conducting particulates and at least a portion of the liquid electrolyte anolyte, and a mixture of at least another portion of the plurality of electrically conducting particulates and at least a portion of the liquid electrolyte catholyte, sufficient to mobilize for transport the mixture of at least the portion of the plurality of electrically conducting particulates and at least a portion of the liquid electrolyte anolyte from the at least one collection region to the at least one introduction region, and the mixture of at least another portion of the plurality of electrically conducting particulates and at least a portion of the liquid electrolyte catholyte from the at least another collection region to the at least another feeding region;

wherein the at least one actuating module incorporates the at least one anodic processing unit arranged to separate at least a portion of the plurality of electrically conducting particulates from the anode particulates bed into at least two classes of particulates with respect to at least one extensive particulate characteristic indicative of amounts of a targeted material incorporated into said electrically conducting particulates, wherein the at least two classes include at least one loaded class of and at least one stripped class of said electrically conducting particulates; and wherein the at least one anodic processing unit has been arranged to transport at least a portion of the at least the stripped class of said electrically conducting particulates collected from the at least one anode particulate bed into the at least one cathode compartment while transporting at least a portion of the at least one loaded class of said electrically conducting particulates into the at least one anode compartment.

2. The apparatus of claim 1 wherein the at least one liquid electrolyte anolyte and the at least one liquid electrolyte catholyte comprise ionizing compounds dissolved in supporting solutions.

3. The apparatus of claim 2 wherein, the supporting solutions are chosen from the set of solutions comprising liquid organic compounds, liquid inorganic compounds, and mixtures of liquid organic compounds and liquid inorganic compounds.

4. The apparatus of claim 2 wherein the supporting solutions are chosen from the set of solutions comprising water, methanol, ethanol, all isomers of propanol, acetonitrile, carbon dioxide, ammonia, acids, bases, methylethyl ketone, tetrahydrofuran, dimethylsulfoxide, and mixtures thereof.

5. The apparatus of claim 1, wherein the at least one actuation module incorporates a pumping element having a pump chosen from a set of pumps consisting of diaphragm pump, peristaltic pump, screw pump, siphon pump, gear pump, progressive cavity pump, rotary piston pump, reciprocating piston pump, rotodynamic pump, hydraulic ram pump, educator-jet pump, radial centrifugal pump, axial centrifugal pump, and any combination of the listed pumps.

6. The apparatus of claim 1, wherein the at least one actuation module incorporates at least one separating unit.

7. The apparatus of claim 6, wherein the at least one separating unit include a separator chosen from set of separators consisting of stationary gravity assisted separators, motion assisted screen separators, rotating drum separators, vibration rotating drum separators, magnetic separators, and combination of the listed separators.

8. The apparatus of claim 1, wherein said plurality of electrically conducting particulates comprise materials arranged to conduct electric charges chosen from a set of electrically conductive and semiconductive materials consisting of chemical elements, metals, alloys, compounds, ceramics, organic polymers, inorganic polymers, graphite, carbon, coke, needle coke, carbobeads, nano-tubes, fullerenes, graphene, and other appropriate forms, and combinations of the listed materials used separately, in combination, or in composite structures with other materials.

9. An apparatus for electrochemical modification of liquid streams including at least one electrolytic cell which comprises:

at least one anode assembly including at least one anode compartment arranged to contain a liquid electrolyte anolyte and a plurality of electrically conducting particulates forming an anode particulate bed, at least one reaction region structured to support electrochemical reactions, at least one collection region structured to facilitate collection of said electrically conducting particulates, at least one introduction region structured to facilitate input of said electrically conducting particulates, and at least one current distribution contactor device in at least intermittent contact with the anode particulate bed;

at least one cathode assembly including at least one cathode compartment arranged to contain a liquid electrolyte catholyte and the plurality of electrically conducting particulates forming a cathode particulate bed, at least another reaction region structured to support electrochemical reactions, at least another collection region structured to facilitate collection of said electrically conducting particulates, at least another introduction region structured to facilitate input of said electrically conducting particulates, and at least another current distribution contactor device in at least intermittent contact with the cathode particulate bed;

at least one actuation module positioned substantially outside of the at least one and the at least another reaction regions and arranged to actuate the plurality of electrically conducting particulates forming the anode particulate bed and the cathode particulate bed, at least two external conduits arranged to support transport of at least a portion of the plurality of electrically conducting particulates, a portion of the liquid electrolyte anolyte, and a portion of the liquid electrolyte catholyte;

and at least one system for driving at least one unidirectional electric current supported by the liquid electrolyte anolyte and the liquid electrolyte catholyte, such that the at least one unidirectional current participates in the electrochemical reactions in the at least one reaction region and in the at least another reaction region;

wherein, the plurality of electrically conducting particulates have been arranged in motion and said particulate motion is substantially independent of bulk flow of the at least one of the liquid electrolyte anolyte and the liquid electrolyte catholyte;

wherein, the at least one actuating module has been arranged to transfer momentum to a mixture of at least a portion of the plurality of electrically conducting particulates and at least a portion of the liquid electrolyte anolyte, and a mixture of at least another portion of the plurality of electrically conducting particulates and at least a portion of the liquid electrolyte catholyte, sufficient to mobilize for transport the mixture of at least the portion of the plurality of electrically conducting particulates and at least a portion of the liquid electrolyte anolyte from the at least one collection region to the at least one introduction region, and the mixture of at least another portion of the plurality of electrically conducting particulates and at least a portion of the liquid electrolyte catholyte from the at least another collection region to the at least another feeding region;

wherein the at least one actuating module incorporates at least one cathodic processing unit arranged to separate at least a portion of the electrically conducting particulates from the cathode particulates bed into at least two classes of particulates with respect to at least one extensive particulate characteristic indicative of amounts of a targeted material incorporated into said electrically conducting particulates, wherein the at least two classes include at least one loaded class of and at least one stripped class of electrically conducting particulates; and wherein the at least one cathodic processing unit has been arranged to transport at least a portion of the at least the stripped class of electrically conducting particulates collected from the at least one cathode particulate bed into the at least one cathode compartment while transporting at least a portion of the at least one loaded class of the particulates into the at least one anode compartment.

10. The apparatus of claim 9 wherein the at least one liquid electrolyte anolyte and the at least one liquid electrolyte catholyte comprise ionizing compounds dissolved in supporting solutions.

11. The apparatus of claim 10 wherein, the supporting solutions are chosen from the set of solutions comprising liquid organic compounds, liquid inorganic compounds, and mixtures of liquid organic compounds and liquid inorganic compounds.

12. The apparatus of claim 10 wherein the supporting solutions are chosen from the set of solutions comprising water, methanol, ethanol, all isomers of propanol, acetonitrile, carbon dioxide, ammonia, acids, bases, methylethyl ketone, tetrahydrofuran, dimethylsulfoxide, and mixtures thereof.

13. The apparatus of claim 9, wherein the at least one actuation module incorporates a pumping element having a pump chosen from a set of pumps consisting of diaphragm pump, peristaltic pump, screw pump, siphon pump, gear pump, progressive cavity pump, rotary piston pump, reciprocating piston pump, rotodynamic pump, hydraulic ram pump, educator-jet pump, radial centrifugal pump, axial centrifugal pump, and any combination of the listed pumps.

14. The apparatus of claim 9, wherein the at least one actuation module incorporates at least one separating unit.

15. The apparatus of claim 14, wherein the at least one separating unit include a separator chosen from set of separators consisting of stationary gravity assisted separators, motion assisted screen separators, rotating drum separators, vibration rotating drum separators, magnetic separators, and combination of the listed separators.

16. The apparatus of claim 9, wherein said electrically conducting particulates comprise materials arranged to conduct electric charges chosen from a set of electrically conductive and semiconductive materials consisting of chemical elements, metals, alloys, compounds, ceramics, organic polymers, inorganic polymers, graphite, carbon, coke, needle coke, carbobeads, nano-tubes, fullerenes, graphene, and other appropriate forms, and combinations of the listed materials used separately, in combination, or in composite structures with other materials.

* * * * *